(12) United States Patent
Phan Le

(10) Patent No.: US 7,958,782 B2
(45) Date of Patent: Jun. 14, 2011

(54) DEVICE WITH A MAGNETIC SENSOR ARRANGEMENT FOR DETECTING ACCELERATION

(75) Inventor: Kim Phan Le, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 11/910,972

(22) PCT Filed: Apr. 6, 2006

(86) PCT No.: PCT/IB2006/051059
§ 371 (c)(1),
(2), (4) Date: Oct. 8, 2007

(87) PCT Pub. No.: WO2006/106490
PCT Pub. Date: Oct. 12, 2006

(65) Prior Publication Data
US 2008/0202241 A1 Aug. 28, 2008

(30) Foreign Application Priority Data
Apr. 8, 2005 (EP) ..................................... 05102796

(51) Int. Cl.
*G01P 15/08* (2006.01)
(52) U.S. Cl. ..................................................... 73/514.31
(58) Field of Classification Search ............... 73/514.31, 73/493, 510–511, 514.16, 514.29
See application file for complete search history.

(56) References Cited

U.S. PATENT DOCUMENTS

| | | | | |
|---|---|---|---|---|
| 3,945,459 A | * | 3/1976 | Oishi et al. .................. | 180/274 |
| 4,096,437 A | * | 6/1978 | Kitzinger et al. ............ | 324/227 |
| 4,365,513 A | * | 12/1982 | Iwasaki ....................... | 73/514.31 |
| 4,500,867 A | * | 2/1985 | Ishitobi et al. ............... | 338/128 |
| 4,843,877 A | * | 7/1989 | Kushida et al. ............. | 73/514.08 |
| 4,901,017 A | * | 2/1990 | Zinke ........................... | 324/239 |
| 4,922,444 A | * | 5/1990 | Baba ............................ | 702/150 |
| 4,967,598 A | * | 11/1990 | Wakatsuki et al. .......... | 73/514.12 |
| 5,036,705 A | * | 8/1991 | Gaines ......................... | 73/514.14 |
| 6,131,457 A | * | 10/2000 | Sato ............................. | 73/514.31 |

(Continued)

FOREIGN PATENT DOCUMENTS

DE 4317512 12/1994

(Continued)

OTHER PUBLICATIONS

Petersen "The Magnetoresistive Sensor, A Sensitive Device for Detecting Magnetic-Field Variations" Electronic Components & Applications. vol. 8, No. 4, (Jan. 1988), pp. 222-238.

(Continued)

*Primary Examiner* — Helen C. Kwok

(57) ABSTRACT

Devices (1) are provided with sensor arrangements (2) comprising field generators (10) for generating magnetic fields and first/second/third elements (R1-R4, S1-S4, T1-T4) for detecting first/second/third components of the magnetic fields in a plane and movable objects (14) for, in response to changing the first/second/third accelerations of the moveable objects (14) in first/second/third directions, changing the first/second/third components of the magnetic fields in the plane. The first (second, third) field detector (11, 12, 13) is more sensitive to the first (second, third) acceleration than to the other accelerations. Such devices (1) have a good sensitivity and a good linearity. The elements (R1-R4, S1-S4, T1-T4) form part of bridges. The first elements (R1-R4) may be in round or rectangular form and the second and third elements (S1-S4, T1-T4) may be in the form of sun beams leaving a sun.

19 Claims, 7 Drawing Sheets

U.S. PATENT DOCUMENTS

| | | | |
|---|---|---|---|
| 6,507,187 B1 * | 1/2003 | Olivas et al. | 324/207.21 |
| 6,529,114 B1 * | 3/2003 | Bohlinger et al. | 338/32 R |
| 6,646,435 B1 * | 11/2003 | Nakamura et al. | 324/207.25 |
| 7,117,732 B2 * | 10/2006 | Curello et al. | 73/149 |
| 7,705,586 B2 * | 4/2010 | van Zon et al. | 324/207.21 |
| 2003/0024314 A1 * | 2/2003 | Akieda et al. | 73/514.31 |

FOREIGN PATENT DOCUMENTS

| | | |
|---|---|---|
| EP | 0 306 178 A2 | 3/1989 |
| EP | 0306175 | 3/1989 |
| EP | 1 521 071 A2 | 4/2005 |
| EP | 1521071 | 4/2005 |
| JP | 01-134267 | 5/1989 |

OTHER PUBLICATIONS

Rottman et al. "New Magnetoresistive Sensors: Engineering and Applications" Sensors and Actuators. vol. A27, No. 1-3, (May 1991), pp. 763-766.

* cited by examiner

DEVICE WITH A MAGNETIC SENSOR ARRANGEMENT FOR DETECTING ACCELERATION

The invention relates to a device with a sensor arrangement, and also relates to a sensor arrangement, and to a sensing method.

Examples of such a device are portable pc's and small handheld electronic devices such as mobile phones, personal digital assistants, digital camera's and global positioning systems.

A prior art device is known from U.S. Pat. No. 6,131,457, which discloses an acceleration sensor comprising a magnetic body mounted to a vibrator having three-dimensional freedom and comprising four magneto-resistive elements. These four magneto-resistive elements detect components of the magnetic field originating from the magnetic body. A difference in output voltage between two magneto-resistive elements positioned along the X-axis indicates an acceleration in the X-direction, and a difference in output voltage between two magneto-resistive elements positioned along the Y-axis indicates an acceleration in the Y-direction. An aggregate sum of the output voltages of all magneto-resistive elements indicates an acceleration in the Z-direction.

The known acceleration sensor is disadvantageous, inter alia, owing to the fact that it requires a biasing magnetic field in addition to the magnetic field originating from the magnetic body to function properly. This additional biasing magnetic field improves the sensitivity and the linearity of the acceleration sensor.

It is an object of the invention, inter alia, to provide a device comprising a sensor arrangement which can detect an acceleration in a plane of the elements and an acceleration perpendicular to the plane of the elements without requiring an additional biasing magnetic field to function properly.

Further objects of the invention are, inter alia, to provide a sensor arrangement which can detect an acceleration in a plane of the elements and an acceleration perpendicular to the plane of the elements without requiring an additional biasing magnetic field to function properly and a sensing method which can detect an acceleration in a plane of the elements and an acceleration perpendicular to the plane of the elements without requiring an additional biasing magnetic field to function properly.

The device according to the invention comprises a sensor arrangement comprising:

a field generator for generating at least a part of a magnetic field, a first field detector comprising first elements for detecting first components of the magnetic field in a plane, a second field detector comprising second elements for detecting second components of the magnetic field in the plane, and a movable object for, in response to a respective first and second acceleration of the movable object in a respective first and second direction, changing the first and second components of the magnetic field in the plane, the first direction being a direction perpendicular to the plane, the second direction being a direction in the plane, and the first field detector being more sensitive to the first acceleration than to the second acceleration and the second field detector being more sensitive to the second acceleration than to the first acceleration.

By introducing at least two separate field detectors each comprising elements for detecting components of a magnetic field in a plane for example formed by these elements, and by making a first field detector more sensitive to a first acceleration in a first direction being a direction perpendicular to the plane than to a second acceleration in a second direction being a direction in the plane, and by making a second field detector more sensitive to the second acceleration than to the first acceleration, separate accelerations in separate directions can be detected. Such a device according to the invention has a good sensitivity and a good linearity and therefore does not need an additional biasing magnetic field to function properly.

The device according to the invention is further advantageous, inter alia, in that temperature disturbances and external field disturbances can be minimized.

An embodiment of the device according to the invention is defined by the first elements forming part of a first bridge and the second elements forming part of a second bridge, second length axes of the second elements being more parallel to the first and second components of the magnetic field in the plane than first length axes of the first elements. Such bridges for example each comprise two elements in a serial configuration or four elements in a Wheatstone configuration. Second length axes of the second elements are made more parallel to the first and second components of the magnetic field in the plane than first length axes of the first elements. This is for example done through locating the second length axes of the second elements more or less parallel to the first and second components of the magnetic field in the plane (with an angle between these second length axes and the components being between 0 degrees and 45 degrees) and locating the first length axes of the first elements more or less perpendicular to the first and second components of the magnetic field in the plane (with an angle between these first length axes and the components being between 45 degrees and 90 degrees). As a result, the respective first and second field detectors are designed to mainly detect an acceleration along respective first and second perpendicular axes.

An embodiment of the device according to the invention is defined by the first elements surrounding the second elements, or vice versa. The first elements may be in round or rectangular form or in any rotational symmetry form and the second elements may be in the form of sun beams leaving a sun. This embodiment prevents location conflicts between the elements.

An embodiment of the device according to the invention is defined by the second elements being substantially saturated. Such substantially saturated elements are more sensitive to changes in directions of the components of the magnetic field in the plane than to changes in the field strength and are less sensitive to stray fields and require a stronger magnetic field to get substantially saturated. The first elements are not saturated, owing to the fact that the first field detector detects the strength of the components of magnetic field in the plane and thus detects accelerations along a first axis perpendicular to the plane.

An embodiment of the device according to the invention is defined by the first elements being magnetically shielded. Such a magnetic shield prevents the first elements from being saturated and forms an alternative to locating the first elements more far away from the field generator generating a stronger magnetic field to get the second elements saturated.

An embodiment of the device according to the invention is defined by the sensor arrangement further comprising:

a third field detector comprising third elements for detecting third components of the magnetic field in the plane, the movable object, in response to a third acceleration of the movable object in a third direction, changing the third components of the magnetic field in the plane, the third direction being a direction in the plane and being a direction perpendicular to the second direction, and the third field detector being more sensitive to the third acceleration than to the first acceleration and the second acceleration. This device comprises three separate field detectors for detecting three separate accelerations along three separate axes.

An embodiment of the device according to the invention is defined by the third elements forming part of a third bridge, third length axes of the third elements being more parallel to the third components of the magnetic field in the plane than first length axes of the first elements. Such a third bridge for example comprises two elements in a serial configuration or four elements in a Wheatstone configuration. Third length axes of the third elements are made more parallel to the third components of the magnetic field in the plane than first length axes of the first elements. This is for example done through locating the third length axes of the third elements more or less parallel to the third components of the magnetic field in the plane (with an angle between these third length axes and the components being between 0 degrees and 45 degrees) and locating the first length axes of the first elements more or less perpendicular to the third components of the magnetic field in the plane (with an angle between these first length axes and the components being between 45 degrees and 90 degrees). As a result, the third field detector is designed to mainly detect an acceleration along a third axis different from and perpendicular to the first and second axes.

An embodiment of the device according to the invention is defined by the first elements surrounding the second and third elements, or vice versa. The first elements may be in round or rectangular form or in any rotational symmetry form and the second and third elements may be in the form of sun beams leaving a sun. This embodiment prevents location conflicts between the elements.

An embodiment of the device according to the invention is defined by the second and third elements being substantially saturated. Such substantially saturated elements are more sensitive to changes in directions of the components of the magnetic field in the plane than to changes in the field strength and are less sensitive to stray fields and require a stronger magnetic field to get substantially saturated.

An embodiment of the device according to the invention is defined by the sensor arrangement further comprising:

means for forcing the movable object into a rest position.

Such means allow to stabilize the position of the movable object at a given acceleration and allow two or more accelerations to be detected without needing to reset the sensor arrangement after each detection.

An embodiment of the device according to the invention is defined by the means comprising elastic material for, at least in case of the movable object being in a non-rest position, extending at least one force on the movable object for bringing the movable object back into the rest position. Such elastic material prevents the need to use loosely moving parts. However, other kinds of means are not to be excluded, such as for example spring systems etc.

Embodiments of the sensor arrangement according to the invention and of the method according to the invention correspond with the embodiments of the device according to the invention.

The invention is based upon an insight, inter alia, that the use of two field detectors for detecting accelerations in three directions requires an additional biasing magnetic field for the acceleration sensor to function properly, and is based upon a basic idea, inter alia, that separate field detectors should be used for detecting separate accelerations in separate directions and that each particular field detector should be more sensitive to a particular acceleration in a particular direction than to other accelerations in other directions.

The invention solves the problem, inter alia, to provide a device comprising a sensor arrangement which can detect an acceleration in a plane of the elements and an acceleration perpendicular to the plane of the elements without requiring an additional biasing magnetic field to function properly, and is further advantageous, inter alia, in that temperature disturbances and external field disturbances can be minimized.

These and other aspects of the invention will be apparent from and elucidated with reference to the embodiments(s) described hereinafter.

Figure 1:
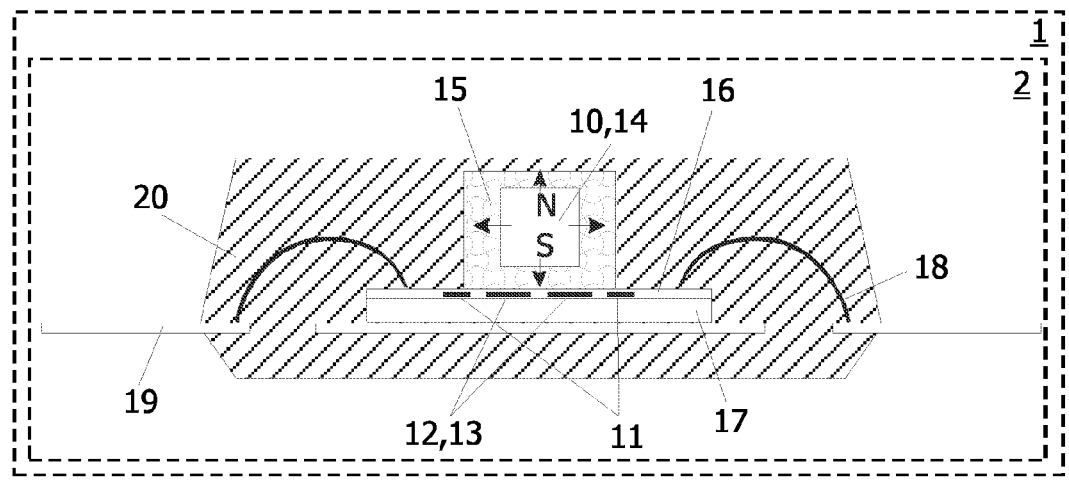
FIG. 1 shows diagrammatically a device according to the invention comprising a sensor arrangement according to the invention in cross section.

The device 1 according to the invention shown in FIG. 1 in cross section comprises the sensor arrangement 2 according to the invention. The sensor arrangement 2 comprises a movable object 14 having three-dimensional freedom and comprising a field generator 10 in the form of a magnet. The movable object 14 is situated in a cavity comprising elastic material 15 for forcing the movable object 14 into a rest position. Thereto, the elastic material, at least in case of the movable object being in a non-rest position, extends at least one force on the movable object 14 for bringing the movable object 14 back into a rest position. Thereto, for example a force is extended in at least one direction parallel to a plane of field detectors 11-13 and/or in at least one direction perpendicular to the plane. The cavity is located above a protection layer 16 covering the field detectors 11-13 and being situated on a substrate 17. This substrate 17 is located on a leadframe 19 and coupled to an outer side of the sensor arrangement 2 via bondwires 18. All parts of the sensor arrangement 2 except the field detectors 11-13 form part of a package 20.

Figure 2:
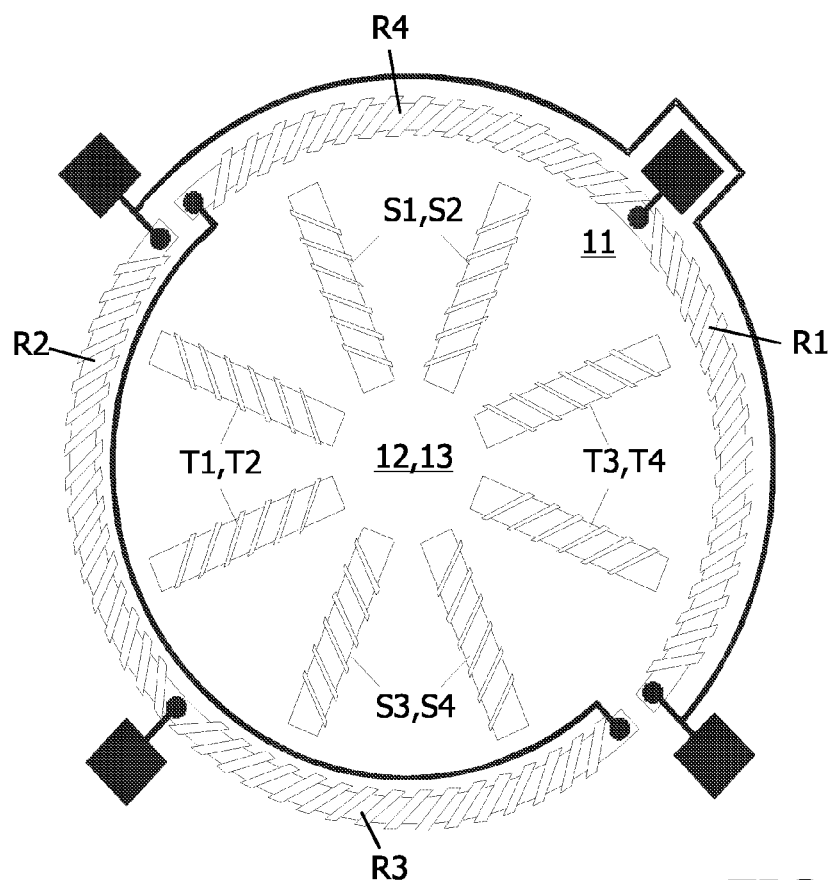
FIG. 2 shows a first, a second and a third field detector for use in the sensor arrangement according to the invention in top view.

In FIG. 2, the first field detector 11 is shown in top view comprising four first elements R1-R4, the second field detector 12 is shown in top view comprising four second elements S1-S4, and the third field detector 13 is shown in top view comprising four third elements T1-T4. The four first elements R1-R4 form part of a first Wheatstone bridge, the four second elements S1-S4 form part of a second Wheatstone bridge, and the four third elements T1-T4 form part of a third Wheatstone bridge. Other bridges comprising two elements in a serial circuit instead of four elements in a Wheatstone bridge are not to be excluded. Each element comprises a magneto-resistive element, without excluding other magnetic field dependent elements.

The first elements R1-R4 surround the second and third elements S1-S4,T1-T4. The first elements R1-R4 may be in round or rectangular form or in any rotational symmetry form and the second and third elements S1-S4,T1-T4 may be in the form of sun beams leaving a sun, without excluding other embodiments. Alternatively, the second and third elements S1-S4,T1-T4 may surround the first elements R1-R4, for example by, in case the second and third elements S1-S4,T1-T4 are in the form of sun beams leaving a sun, locating the first elements R1-R4 inside that sun. But in that case, the first elements R1-R4 might need to become smaller, which would result in these first elements R1-R4 getting a decreased resistance value, which would result in an increased power consumption.

Figure 3:
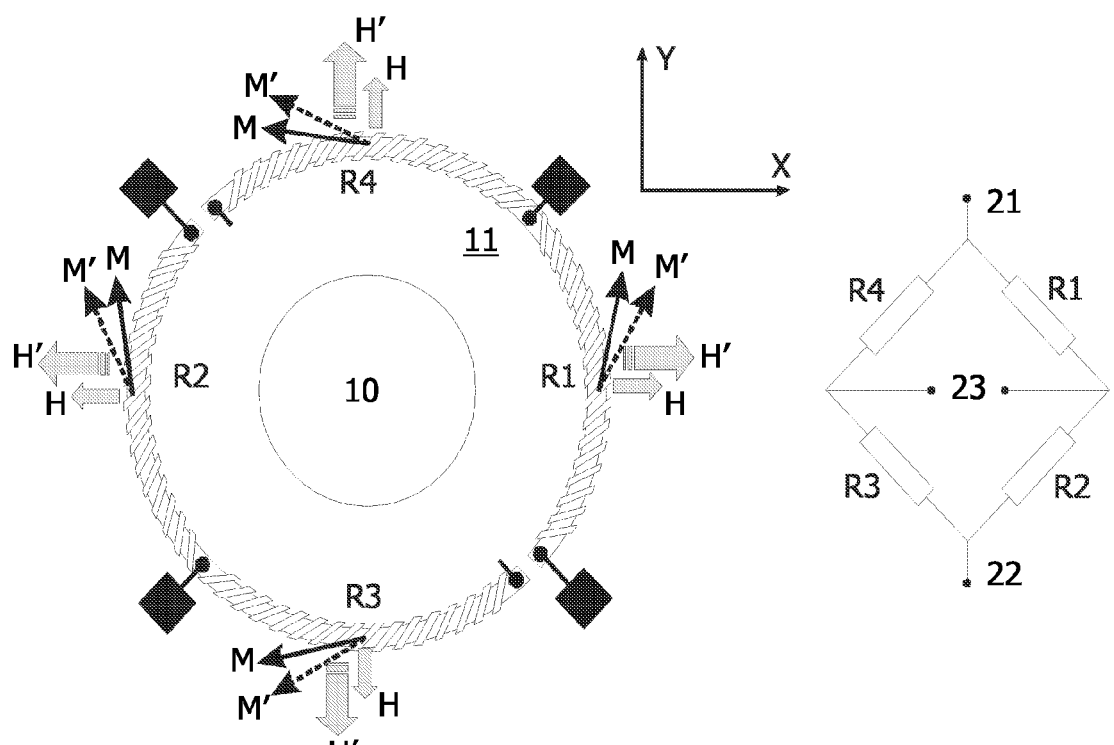
FIG. 3 shows the first field detector comprising first elements together with radial components H of a magnetic field and magnetizations M per first element in top view and shows the first field detector with its first elements in schematic form.

In FIG. 3, the first field detector 11 comprising the first elements R1-R4 is shown in top view together with radial components H of a magnetic field and with magnetizations M per the first elements R1-R4. The first elements R1-R4 form a plane comprising the X-axis and the Y-axis. The radial components H and the magnetizations M are all situated in this plane and result from a magnetic field originating from the field generator 10 located at a distance in the Z-direction. The radial components H' and the magnetizations M' are also situated in this plane and result from the magnetic field originating from the field generator 10 now located at a smaller distance in the Z-direction. Obviously, the radial component H' has increased for each first element, and the magnetization M' has turned. Further, the first field detector 11 with its first elements R1-R4 is shown in schematic Wheatstone bridge form. Input voltages are supplied to the input terminals 21,22, and between the output terminals 23 an output signal is available representing a strength of an acceleration in the Z-direction, in other words in a first direction perpendicular to the plane.

In a corresponding way, the second elements S1-S4 may form part of a second Wheatstone bridge for generating an output signal representing a strength of an acceleration in the X-direction, in other words in a second direction situated in the plane. And the third elements T1-T4 may form part of a third Wheatstone bridge for generating an output signal representing a strength of an acceleration in the Y-direction, in other words in a third direction situated in the plane and perpendicular to the second direction. The construction shown in FIG. 2 is advantageous in that the second and third bridges are theoretically only sensitive to accelerations in directions in the plane and are theoretically not sensitive to accelerations in directions perpendicular to the plane (these second and third bridges are theoretically only sensitive to displacements of the centre of the radial field), and in that the first bridge is theoretically only sensitive to accelerations in directions perpendicular to the plane and is theoretically not sensitive to accelerations in directions in the plane. Other constructions can of course be derived from the above description.

Figure 4:
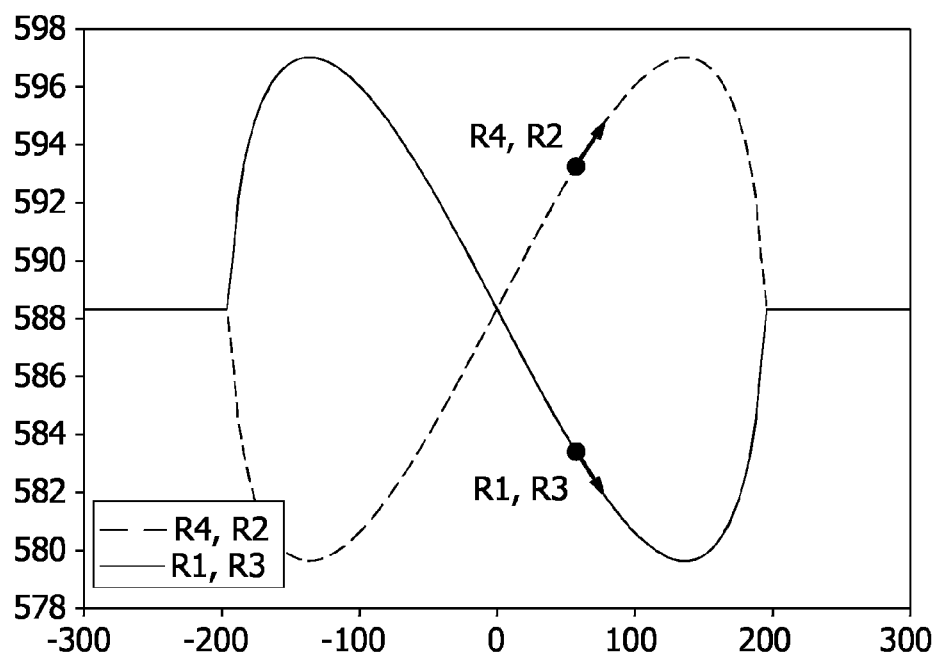
FIG. 4 shows characteristics of the first elements (Y-axis: resistance value, X-axis: magnetic field value)

The characteristics of the first elements R1-R4 (Y-axis: resistance value, in Ohm, X-axis: magnetic field value, in Oested) are shown in FIG. 4. Back to FIGS. 2 and 3, the first bridge consists for example of two halve-rings made of permalloy thin film strips. By placing four contacts at the ends and middles of the half-rings, four legs of the Wheatstone bridge can be defined, each leg comprising an element for example in the form of a magneto-resistive strip with barberpoles. Because the width of the rings is much smaller than the length and the radius of the rings, at any point on the rings, the magnetic shape anisotropy direction is the tangential direction at that point. Therefore when there is no magnetic field present, the magnetization direction in the strips follows the tangential direction of the ring.

Initially the magnetization direction is for example oriented counter clockwise in the upper-right half-ring and clockwise in the lower-left half-ring. This can be done by e.g. applying a magnetic field pulse in the direction from lower-right to upper-left. The barberpoles on the strips are arranged such that, in each bridge leg, they are oriented at different angles $\beta$ with respect to the initial magnetization directions (i.e. tangential to the rings). Within one bridge leg, the angle $\beta$ is fixed. In the example shown, $\beta=+45°$ for R1, $\beta=-45°$ for R2, $\beta=+45°$ for R3 and $\beta=-45°$ for R4 (the angles $\beta$ have the same absolute value but different signs). The different signs of $\beta$ cause the opposite behaviours of the characteristics as shown in FIG. 4. When the field generator 10 is placed above the plane and in the rest position (i.e. it is centred in the rings), its radial components H will force the magnetization M inside the bridge legs to rotate slightly outwards. The amount of rotation depends on the competition between the shape anisotropy of the strips and the in-plane magnetic field strength of the field generator 10 at the location of the strip. The angle of the magnetisations M with respect to the tangent direction when the field detector 10 is in the rest position should not excess 45°, and should preferably be well below 45°. This is to ensure that the working point of the bridge leg is still within the linear region of the characteristic curve, as shown by the black dots on the characteristics in FIG. 4.

When the sensor arrangement 2 is accelerated in the Z-direction, the field generator 10 will slightly move along the Z-axis. For instance, it moves closer to the plane. The radial component of the magnetic field (the in-plane component) at the sensor strips is therefore enhanced (as indicated by H'). Consequently, the magnetization in the strips rotates further outwards (as indicated by M').

The different arrangements of the barberpoles in the bridge legs are responsible for the fact that the resistance value of the first element R1 decreases while the resistance value of the first element R2 increases. Similarly, the resistance value of the first element R3 decreases and the resistance value of the first element R4 increases, as expressed by the formula: $R=R_0*[1+MR*\cos^2(\alpha+\beta)]$, in which R is the resistance of the resistor (i.e. a bridge leg), $R_0$ is the lowest resistance of the resistor, MR is the magneto-resistance ratio of the material, $\alpha$ is the angle between a magnetization vector and an initial magnetization direction (when no magnetic field is present) at that point (i.e. the same as the tangential direction of the strip), $\beta$ is a barberpole angle. $\alpha$ may be different at different points on the same resistor, for example in case the magnet is not at the centre. In FIG. 4, the changes in the resistance values are indicated by the arrows. Consequently a signal change in the output signal of the first bridge can be observed.

A reversed situation occurs when the field detector 10 moves further away from the plane. In this case, the resistance value of the first elements R1 and R3 increases while the resistance value of the first elements R2 and R4 decreases. The output signal on the output of the first bridge will change in the opposite direction. It may happen that the magnetization vectors in the resistors are flipped by a strong disturbing field. This can be solved by using a flipping coil, which is for instance built inside the package 20, to reset the magnetization of the resistors every time the sensor arrangement 2 is powered up.

The first bridge is by definition not sensitive to any movement of the field generator 10 in the X- and Y-directions. When the field detector 10 moves in the X-direction from left to right, for instance, the in-plane component of the field increases at R1 while decreases at R2, with the same amount. Consequently, both resistance values of the first elements R1 and R2 decrease equally, thus resulting in no change in the output signal of the first bridge. Similarly, when the field generator 10 moves in the Y-direction, or in any direction in the X-Y plane, no signal change will be observed. This is the case when the in-plane field profile and the strip characteristics are linearly dependent on the movements of the field generator 10 in the X- and Y-directions (within the range of the movement). In reality, they are not completely linear thus causing a small change in the output signal of the first bridge when the field generator 10 moves in X- and Y-directions. This small change, compared to the signal change when the field generator moves in the Z-direction, is defined as the cross-sensitivity. It will be shown later that this cross-sensitivity is not significant.

To keep the working point of the first elements R1-R4 within the linear region of the characteristic curve, one could increase the shape anisotropy of the strip (related to the anisotropy field) and/or could reduce the strength of the field generator 10 at the location of the strips. The shape anisotropy can be reduced by decreasing the strip width and increasing the strip thickness. For instance, a strip measuring 10 μm in width and 0.03 μm in thickness has an anisotropy field of 70 Oe. For a strip measuring 6 μm in width and 0.06 μm in thickness, this is 193 Oe. However, there is a limit in reducing the strip width in view of the fabrication and the design of the barberpoles. Increasing the thickness too much would reduce the strip resistance, which results in more power consumption. The strength of the magnetic field can be reduced by using a smaller or weaker field generator 10 and placing the first bridge far enough from the centre of the field generator 10. Normally a strong magnet is used to saturate the strips in second and third bridges. This saturation in the second and third bridges is an important requirement, in contrast to the first bridge.

Figure 5:
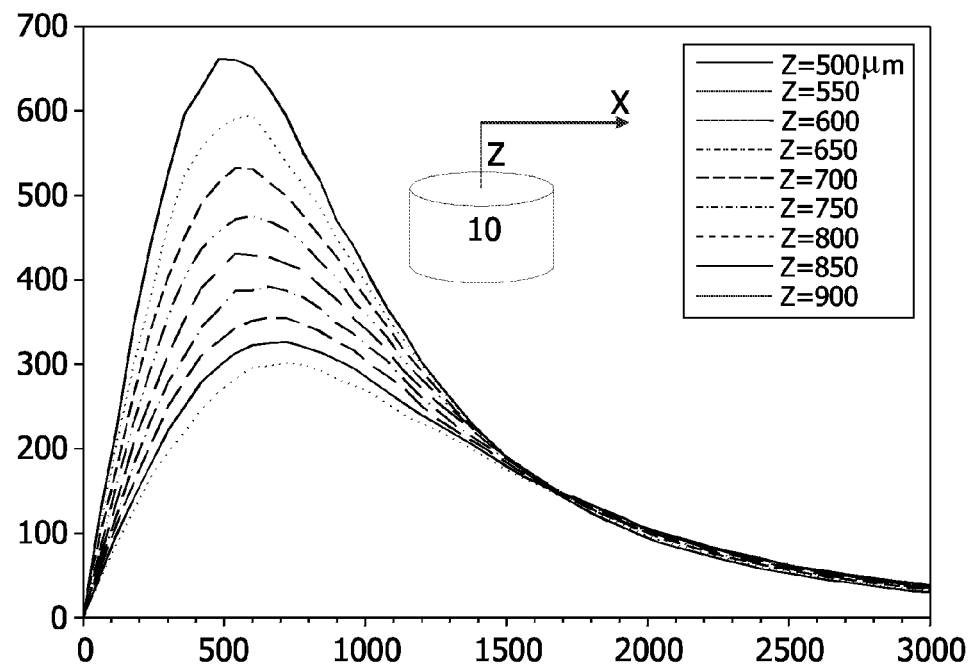
FIG. 5 shows characteristics of the field generator (Y-axis: radial component value of the magnetic field, X-axis: radial distance value from the center of the field generator, for different perpendicular distance values)

The characteristics of the field generator are shown in FIG. 5 (Y-axis: radial component value of the magnetic field, in Oested, X-axis: radial distance value from the centre of the field generator, for different perpendicular distance values, in micrometer). The X-component of a magnetic field of a field generator 10 in the form of a cylindrical NdFeB magnet measuring 500 μm in length and 800 μm in diameter is a radial component at different distances Z from the top surface of this magnet. To reduce the magnetic field, the first bridge should be placed far away from the field peak. However, in this example, at about X=1500 μm there is a crossing point of the curves, where the radial component does no longer change with the distance Z. Further than this "blind" point, the field profile is reversed. Therefore, one should avoid placing the first bridge close to or at the other side of this crossing point.

Figure 6:
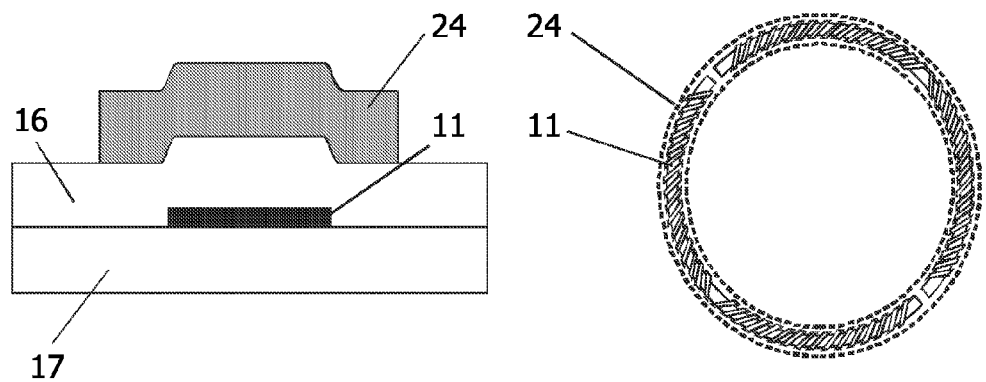
FIG. 6 shows the first field detector being shielded in cross section and in top view.
Figure 7:
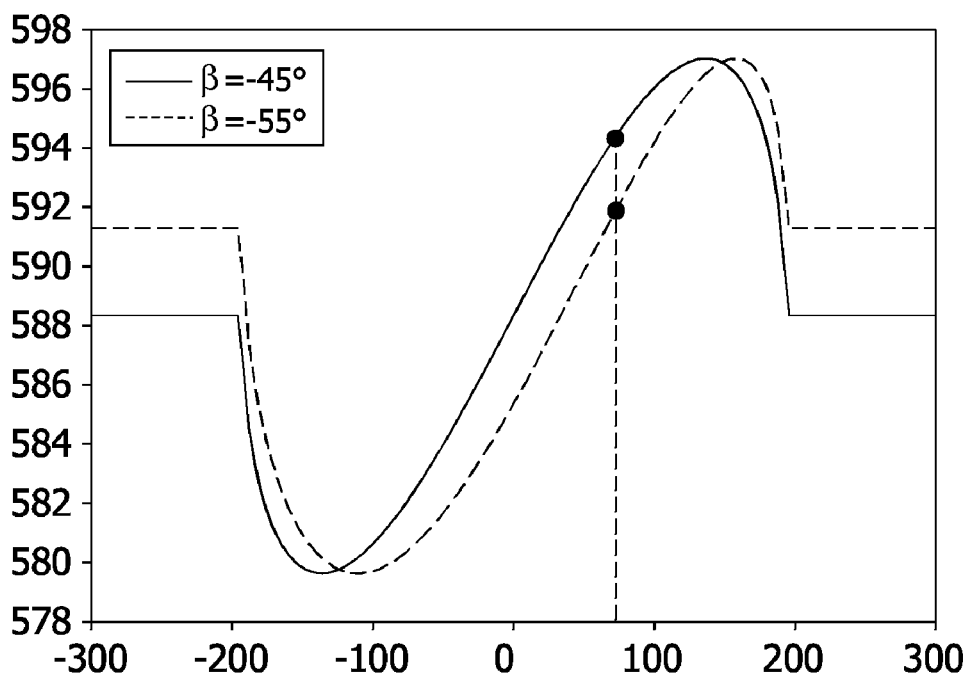
FIG. 7 shows characteristics of different elements with the same dimensions but with different barberpole strip angles.

The magnetic field might be still too large compared to the anisotropy field of the strip. The best way to further reduce the magnetic field is to place a magnetic shield 24 on top of the strips of the first bridge, as shown in FIG. 6. The magnetic shield 24 can be made of a high permeability material, preferably the same material as the strips, such as permalloy. A field reduction factor of five to ten times can easily be achieved. For instance, calculations show that for a sensor width=10 μm, sensor thickness=0.03 μm, shield-sensor distance=0.5 μm, shield width=10 μm, shield thickness=1μ, the reduction factor is 7.5, without excluding other sizes. Another way to move the working point further towards the centre of the linear region is to change the barberpole angle β, as shown in FIG. 7.

Figure 8:
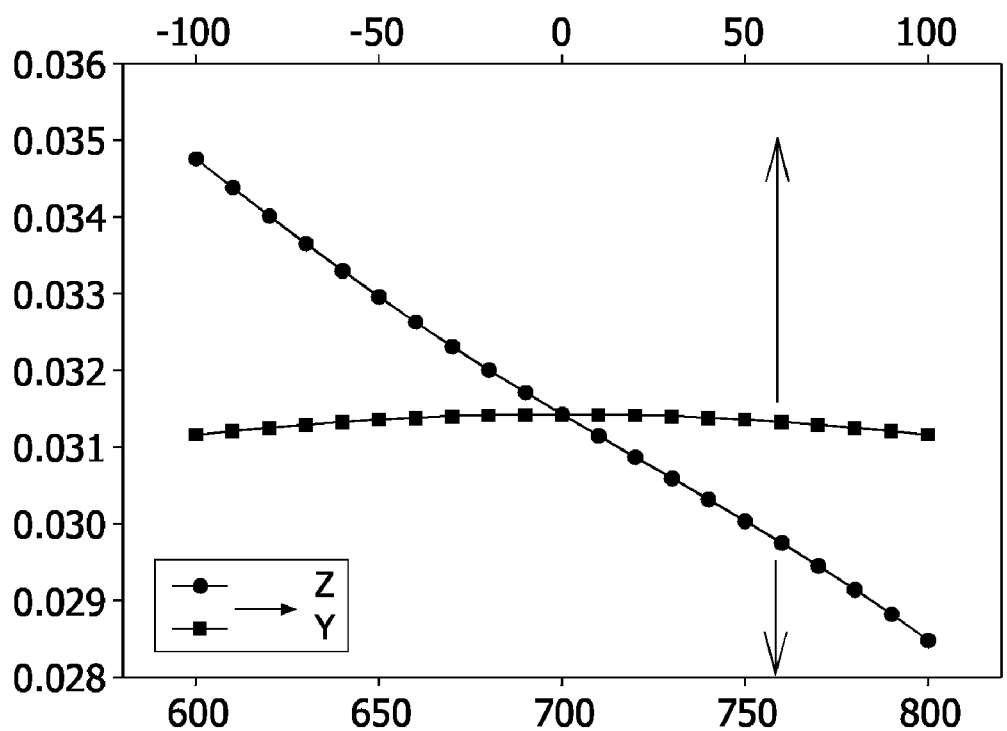
FIG. 8 shows an output signal of the first field detector as a function of a perpendicular displacement for a fixed radial distance and as a function of a radial displacement for a fixed perpendicular distance (Y-axis: Volt, X-axis; micrometer)

FIG. 8 shows an output signal of the first field detector as a function of a perpendicular displacement for a fixed radial distance (solid circles) and as a function of a radial displacement for a fixed perpendicular distance (solid squares) (Y-axis: Volt, X-axis; micrometer). As discussed before, the first bridge is by definition only sensitive to the Z-movement, and is not sensitive to any X- and Y-movements. However in reality, cross-sensitivity may occur due to the non-linearity of the magnet profile and the characteristic curve. The sensitivity of the first bridge when the magnet moves in different directions can be calculated and shown. In the calculations, it is supposed that the ring radius=900 μm, the shielding factor=5, the anisotropy field=193 Oe, the magnetization ratio=3%, the input voltage of the bridge=3V and the NdFeB magnet measures 500 μm in length and 800 μm in diameter. In FIG. 8, two curves are shown.

Figure 9:
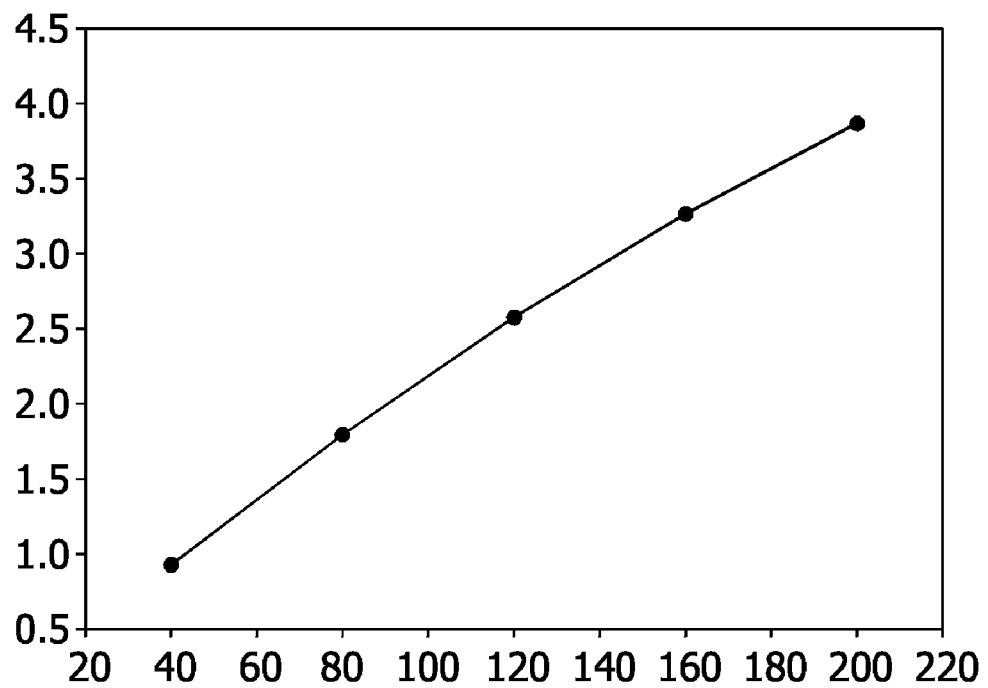
FIG. 9 shows a cross sensitivity of the first field detector as a function of a radial displacement (Y-axis: percentage, X-axis: micrometer)

A first curve (solid circles) is the output signal of the first bridge versus the displacement of the magnet from 600 to 800 μm in the Z-direction, during this movement, the X and Y coordinates are kept at zero. A second curve (solid squares) is the output signal of the first bridge versus the displacement of the magnet from −100 to +100 μm in the Y-direction, the Z coordinate is kept at 700 μm, and the Y coordinate is kept at 0 μm. The range of both movements is 200 μm. The bridge output signal exhibits a small parabole-like change versus the Y-displacement, which suggest that the cross-sensitivity increases with increasing displacement range. If the magnet moves in the X-direction or in any direction in the X-Y plane, the bridge output signal behaves exactly the same. In FIG. 9, a cross sensitivity of the first field detector as a function of a radial displacement (Y-axis: percentage, X-axis: micrometer) is shown.

Figure 10:
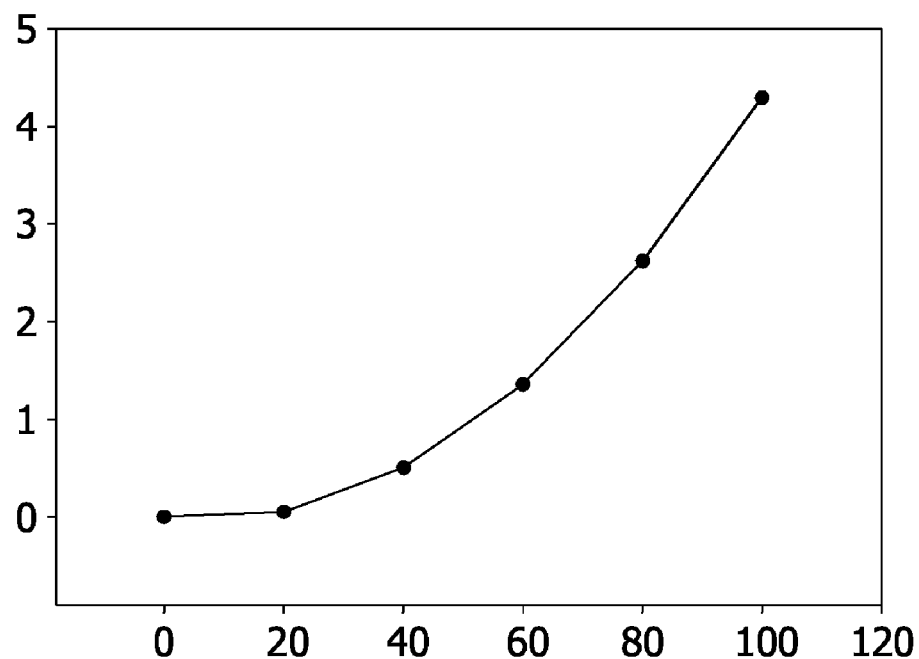
FIG. 10 shows an error of the first field detector as a function of a strength of a disturbing field (Y-axis: percentage, X-axis: field value, in Oested)
Figure 11:
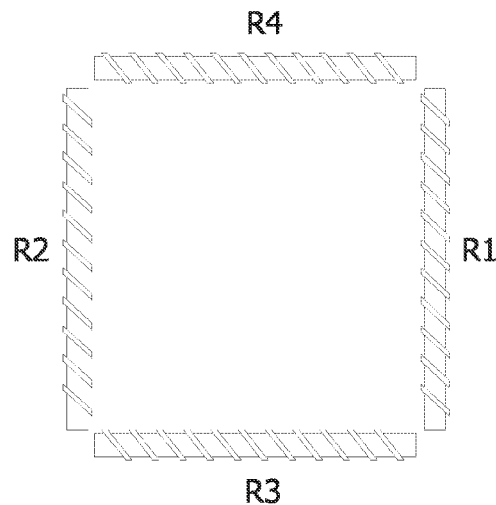
FIG. 11 shows a first field detector in a square form.

For the first and second bridges, the influence of an external disturbing field is minimized because the strips are substantially saturated by a strong permanent magnet. The first bridge (not being operated at saturation) is by definition not sensitive to the external disturbing field. Because the field detectors 11-13 are only sensitive to in-plane components of the magnetic field, only the projection of the external disturbing field in the X-Y plane is to be considered. The influence of an external disturbing field in the X-Y plane can be considered similar to the movement of the magnet in the same plane. The error resulting from the external disturbing field is shown in FIG. 10. In a normal environment, the external disturbing field hardly excesses a few tens of Oe, which means that the error should be as low as about 1% or less.

The elastic material surrounding the magnet should have a high elasticity for both compression and extension. It should have low drift and low hysteretic within the movement range of the magnet. Many synthetic or natural materials may fulfil these requirements. Several types of silicon rubber like polydimethylsiloxane are for example suitable materials. The first bridge can be arranged in a square structure as shown in FIG.

Figure 12:
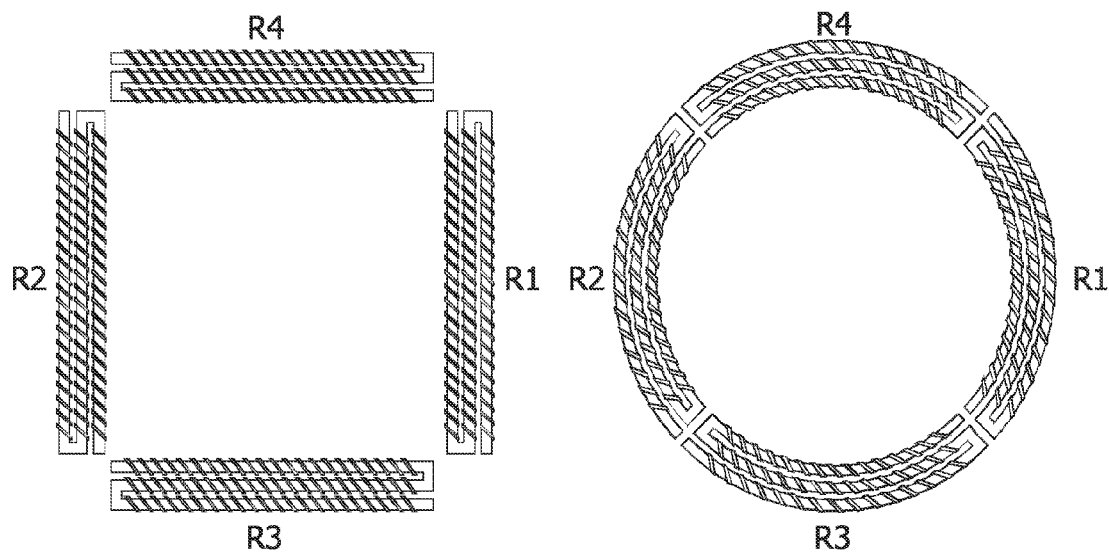
FIG. 12 shows a first field detector in a square form and in a round form, both in meander shape.

11. Calculations show that the square structure gives about 30% less sensitivity than the ring structure having the same size and strip dimensions. To increase the strip resistance, the first elements R1-R4 can have a meander shape as shown in FIG. 12.

Figure 13:
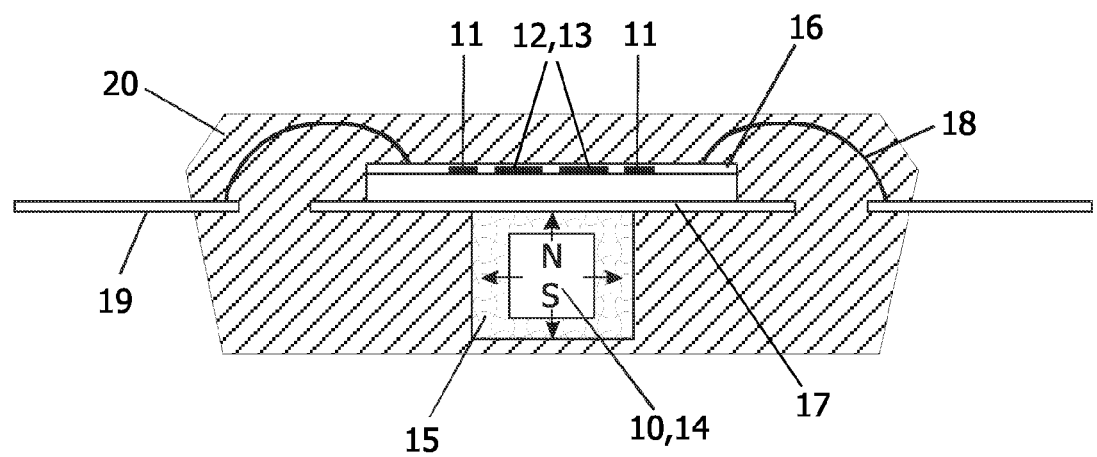
FIG. 13 shows a first alternative sensor arrangement according to the invention.
Figure 14:
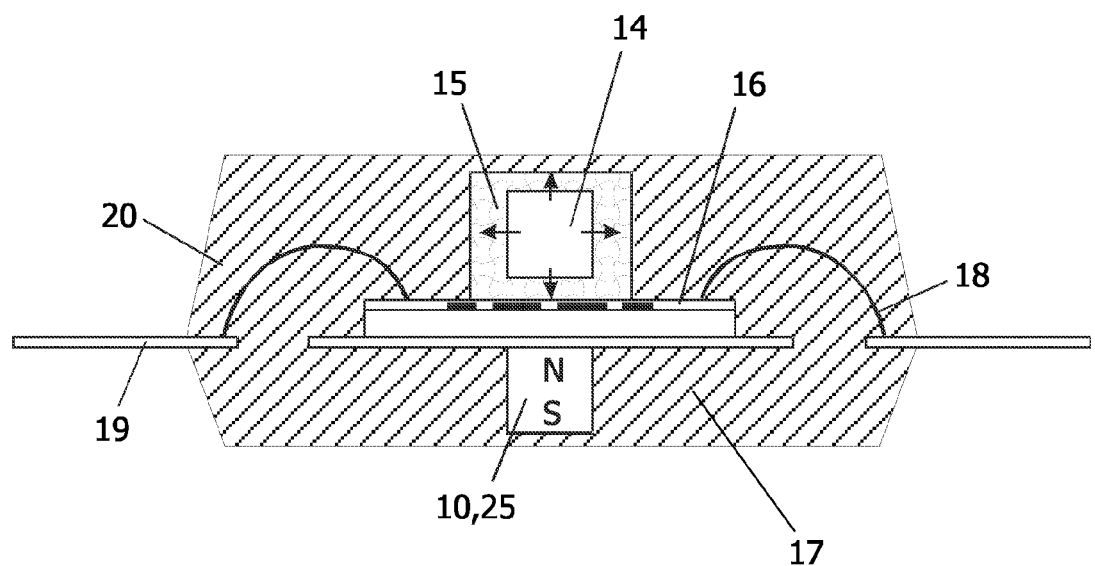
FIG. 14 shows a second alternative sensor arrangement according to the invention.

FIG. 13 shows a first alternative sensor arrangement 2 according to the invention and FIG. 14 shows a second alternative sensor arrangement 2 according to the invention. In the first alternative, the field generator 10 can be placed underneath the field detector 11-13. In this case the distance from the field generator 10 to the plane of the field detector 11-13 is larger than that of the embodiment shown in FIG. 1 (at least the distance must be larger than the substrate thickness). The magnetic field applying on the field detector 11-13 will be smaller (resulting from a larger distance), which is not desirable for the first and second bridges.

In the second alternative, a fixed object 25 comprising the field generator 10 is placed underneath the substrate 17. A movable object 14 comprising soft-magnetic mass is placed above the plane of the field detector 11-13, inside a cavity filled with an elastic material 15. Alternatively, a fixed object 25 comprising the field generator 10 is placed above the substrate 17 and a movable object 14 comprising soft-magnetic mass can be placed under the plane of the field detector 11-13, inside a cavity filled with an elastic material 15. The movement of the soft-magnetic mass, due to acceleration, will alter the magnetic field lines of the magnet (the field generator 10), and will thus alter the position of the centre of the radial field, which finally results in a signal change in the output signal of a bridge. To obtain a detectable signal change, the size of the mass should not be larger than the size of the magnet.

The acceleration sensor arrangements 2 are widely used in various applications such as automotive (vehicle dynamics control devices, active suspension control devices, headlight leveling system devices, car alarm devices etc.), navigation (mobile phone devices, global positioning system devices etc), appliances (washing machine devices comprising balancing devices etc.), impact/shock detection (detector devices etc.), gaming and robotics (game devices etc., robot devices etc.), data entry for personal digital assistants (handheld devices etc.), earthquake monitoring (monitor devices etc.), human monitoring devices (human monitor devices etc.), antenna azimuth control (antenna control devices etc.) etc.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A device with a sensor arrangement comprising:
    a field generator for generating at least a part of a magnetic field, a first field detector comprising first elements for detecting first components of the magnetic field in a plane,
    a magnetic shield located substantially between the first elements and the field generator, wherein the first elements are magnetically shielded to reduce the magnetic field from the field generator at the first elements,
    a second field detector comprising second elements for detecting second components of the magnetic field in the plane, wherein the first field detector and the second field detector operate in an absence of a biasing magnetic field, and
    a movable object for, in response to a respective first and second acceleration of the movable object in a respective first and second direction, changing the first and second components of the magnetic field in the plane, the first direction being a direction perpendicular to the plane, the second direction being a direction in the plane, and the first field detector being more sensitive to the first acceleration than to the second acceleration and the second field detector being more sensitive to the second acceleration than to the first acceleration.

2. The device according to claim 1, the first elements forming part of a first bridge and the second elements forming part of a second bridge, second length axes of the second elements being more parallel to the first and second components of the magnetic field in the plane than first length axes of the first elements.

3. The device according to claim 1, the first elements surrounding the second elements, or vice versa.

4. The device according to claim 1, further comprising a strong permanent magnet to substantially saturate the second elements.

5. The device according to claim 1, the sensor arrangement further comprising:
    a third field detector comprising third elements for detecting third components of the magnetic field in the plane, the movable object, in response to a third acceleration of the movable object in a third direction, changing the third components of the magnetic field in the plane, the third direction being a direction in the plane and being a direction perpendicular to the second direction, and the third field detector being more sensitive to the third acceleration than to the first acceleration and the second acceleration.

6. The device according to claim 5, the third elements forming part of a third bridge, third length axes of the third elements being more parallel to the third components of the magnetic field in the plane than length axes of the first elements.

7. The device according to claim 5, the first elements surrounding the second and third elements, or vice versa.

8. The device according to claim 5, further comprising a strong permanent magnet to substantially saturate the second and third elements.

9. The device according to claim 1, the sensor arrangement further comprising: means for forcing the movable object into a rest position.

10. The device according to claim 9, the means for forcing comprising elastic material for, at least in case of the movable object being in a non-rest position, extending at least one force on the movable object for bringing the movable object back into the rest position.

11. A sensor arrangement comprising:
    a field generator for generating at least a part of a magnetic field, a first field detector comprising first elements for detecting first components of the magnetic field in a plane,
    a magnetic shield located substantially between the first elements and the field generator, wherein the first elements are magnetically shielded to reduce the magnetic field from the field generator at the first elements, a second field detector comprising second elements for detecting second components of the magnetic field in the plane, wherein the first field detector and the second field detector operate in an absence of a biasing magnetic field, and a movable object for, in response to a respective first and second acceleration of the movable object in a respective first and second direction, changing the first and second components of the magnetic field in the plane, the first direction being a direction perpendicular to the plane, the second direction being a direction in the plane, and the first field detector being more sensitive to the first acceleration than to the second acceleration and the second field detector being more sensitive to the second acceleration than to the first acceleration.

12. A sensing method comprising the steps of:

generating at least a part of a magnetic field, detecting first components of the magnetic field in a plane via first elements of a first field detector, wherein the first elements are magnetically shielded a magnetic shield located substantially between the first elements and the field generator to reduce the magnetic field from the field generator at the first elements, detecting second components of the magnetic field in the plane via second elements of a second field detector, wherein detecting first components of the magnetic field and detecting second components of the magnetic field occur in an absence of a biasing magnetic field, and in response to a respective first and second acceleration of a movable object in a respective first and second direction, changing the first and second components of the magnetic field in the plane, the first direction being a direction perpendicular to the plane, the second direction being a direction in the plane, and the detecting via the first field detector being more sensitive to the first acceleration than to the second acceleration and the detecting via the second field detector being more sensitive to the second acceleration than to the first acceleration.

13. The device according to claim 10, wherein the elastic material fills a cavity within the device and surrounds the field generator.

14. The device according to claim 10, wherein the elastic material fills a cavity within the device and surrounds a soft-magnetic mass, the soft-magnetic mass to alter the magnetic field generated by the field generator.

15. The device according to claim 1, wherein at least one of the first field detector and the second field detector comprises a magneto-resistive strip on a barberpole.

16. The device according to claim 1, further comprising:

a substrate, wherein the first and second elements are disposed on the substrate;

a protection layer disposed on the substrate and on the first and second elements, wherein the magnetic shield is disposed on the protection layer substantially on top of the first elements.

17. The device according to claim 1, wherein the second elements of the second field detector are arranged in a sunbeam pattern extending in substantially radial directions, and the first elements of the first field detector are arranged in a substantially enclosed pattern.

18. The device according to claim 17, wherein the first field detector with the first elements arranged in the enclosed pattern substantially surround the second field detector with the second elements arranged in the radial directions.

19. The device according to claim 17, wherein the second field detector with the second elements arranged in the radial directions surround the first field detector so that the second elements are outside of a central area substantially enclosed by the first elements of the first field detector, wherein the first and second elements of the first and second field detectors are aligned with a substantially central point.

* * * * *